June 29, 1948.　　　　A. EASTON　　　　2,444,341
INSTRUMENT FOR MEASURING RISE
TIME OF AN ELECTRICAL PULSE
Filed May 21, 1945
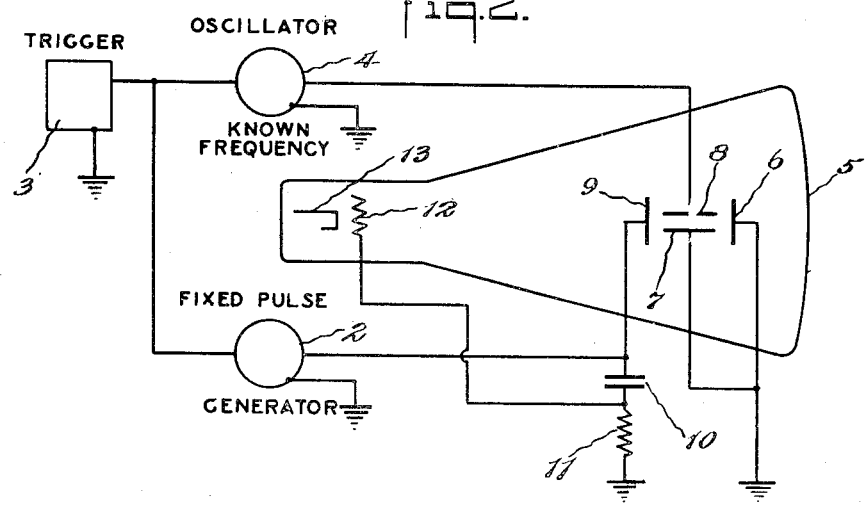
INVENTOR
ALLAN EASTON
BY
ATTORNEYS Patented June 29, 1948

2,444,341

UNITED STATES PATENT OFFICE 2,444,341

INSTRUMENT FOR MEASURING RISE TIME OF ELECTRICAL PULSES

Allan Easton, Long Island City, N. Y., assignor to Emerson Radio and Phonograph Corporation, New York, N. Y., a corporation of New York Application May 21, 1945, Serial No. 595,028

2 Claims. (Cl. 175—381)

1

In connection with various types of electrical signaling and measurement it has become customary to use pulses of current. It is therefore necessary for the proper design of such systems to know with accuracy the characteristics of the pulses which may be used. One characteristic which should be known, and which has heretofore been difficult to measure accurately, is the length of time during which a particular pulse may be rising in amplitude. The measurement of this characteristic becomes more difficult of course as the time during which such rise occurs becomes shorter.

Accordingly it is an object of the present invention to provide a new apparatus and method for measuring the rise time of fast pulses.

In the drawings—

Figure 1 is a graph illustrating a pulse of current whose rise time is to be measured;

Figure 2 is a circuit diagram partially in block form illustrating my invention; and Figure 3 is a graph illustrating the type of trace which might appear on the face of a cathode ray tube when practicing my invention.

In Figure 1 the unknown pulse whose rise time is to be measured has been marked 1. It will be noted that it is shown as having a horizontal component 15 prior to the rise, a sharp rise 16 to a peak value, a period of time 17 during which the value is constant at this peak, a sharp drop 18 to its original value, and a period of time 19 during which the original value is maintained.

Such a pulse to be measured may be generated in the fixed pulse generator 2 of Figure 2. It may be triggered off by the trigger device 3 at a desired moment. The trigger 3 also triggers in oscillator 4 which produces a known frequency. A cathode ray tube 5 has one vertical plate 6 and one horizontal plate 7 grounded in accordance with usual practice. The voltage from oscillator 4 of known frequency is applied to vertical plate 8, while the unknown pulse is applied to horizontal plate 9. A differentiating circuit consisting of condenser 10 and resistance 11 differentiates the fixed pulse voltages and applies a derivative voltage thereof to the grid 12 of the cathode ray tube, whose cathode 13 is also illustrated.

In practicing my invention, the oscillator 4 and pulse generator 2 are both triggered off simultaneously by the trigger device 3, as before stated. This applies a known frequency to the vertical plates of the cathode ray tube and the pulse to be measured to the horizontal plates. The trace which appears may take the form illustrated by the curve in Figure 3. The vertical line 14 is traced during the interval represented by the horizontal portion 15 of the curve 1. During this interval the voltage across the horizontal plates will be constant while the voltage across the vertical plates will be variable, causing a vertical trace. When the time arrives corresponding to the rise 16 in the curve 1 the voltage across the horizontal plates will rise rapidly to a peak value represented by the portion 17 of the curve. The voltage represented by the portion 16 of the curve 1 will move the trace to the right in Figure 3 while the alternating voltage across the vertical plates will give it a vertical component as illustrated by the portion 20 of the curve in that figure. During the time the voltage rise 16 is occurring the trace across the screen will follow the path illustrated by the curve 20. When the pulse voltage reaches the portion 17 a steady potential will be applied across the horizontal plates, so again the trace will be a vertical line illustrated by 21.

During the rise time 16 a positive pulse of voltage is applied to the grid 12 of the cathode ray tube by reason of the derivative circuit 10, 11, and this intensifies the trace on the screen during this rise. When the portion 18 of the curve 1 is reached the derivative circuit causes a negative pulse to be applied to the grid 12, thus cutting off the electron beam and preventing a return trace from appearing on the screen.

In order to measure the time of rise of the fixed pulse, therefore, all that is necessary is to count the number of cycles or portions thereof of the curve 20. As this represents a known frequency the time will be a direct function of the number of cycles of this frequency between the vertical lines 14 and 21 which represent the beginning and the end of the rise time of the fixed pulse.

It will be understood by those skilled in the art that my invention is capable of various modifications and I do not therefore desire to be restricted to the particular details shown and described but only within the scope of the appended claims.

What is claimed is:

1. In apparatus for measuring the rise time of an electric pulse, means for generating electrical oscillations of a known frequency sufficiently great to pass through a number of cycles during said rise time, a cathode ray tube having a screen, a grid and at least two angularly disposed pairs of deflecting plates, means for applying said oscillations to one pair of said plates, means for simultaneously applying said pulse to another pair of said plates, means for deriving a differentiated voltage from said pulse, and means for applying said differentiated voltage to said grid to impinge a cathode ray beam on said screen during rise of said pulse and to extinguish said beam during decay of the pulse thereby to produce an observable trace on said screen.

2. In apparatus for measuring the rise time of an electric pulse, means for generating electrical oscillations of a known frequency sufficiently great to pass through a number of cycles during said rise time, a cathode ray tube having a cathode, a screen, a grid and at least two angularly disposed pairs of deflecting plates, means for applying said oscillations to one pair of said plates, means for simultaneously applying said pulse to another pair of said plates, a capacitor and a resistor connected in series with a junction therebetween, means for connecting said junction to said grid, and means for so applying said pulse across said capacitor and resistor as to make said junction positive with respect to said cathode to impinge a cathode ray beam on said screen during rise of the pulse and negative with respect to said cathode to extinguish said beam during decay of the pulse thereby to produce an observable trace on said screen.

ALLAN EASTON.

REFERENCES CITED

The following references are of record in the file of this patent:

UNITED STATES PATENTS

| Number | Name | Date |
|---|---|---|
| 1,592,274 | Kipping | July 13, 1926 |
| 1,939,434 | Busse | Dec. 12, 1933 |
| 2,011,260 | Prinz | Aug. 13, 1935 |
| 2,078,644 | Swedlund | Apr. 27, 1937 |
| 2,122,499 | Stocker | July 5, 1938 |
| 2,301,197 | Bradford | Nov. 10, 1942 |
| 2,332,300 | Cook | Oct. 19, 1943 |
| 2,363,810 | Schrader et al. | Nov. 28, 1944 |
| 2,412,963 | Chatterjea et al. | Dec. 24, 1946 |